Sept. 30, 1930.       C. R. WEGENER       1,776,873
FAULT DETECTOR FOR TRANSFORMERS
Filed July 1, 1926
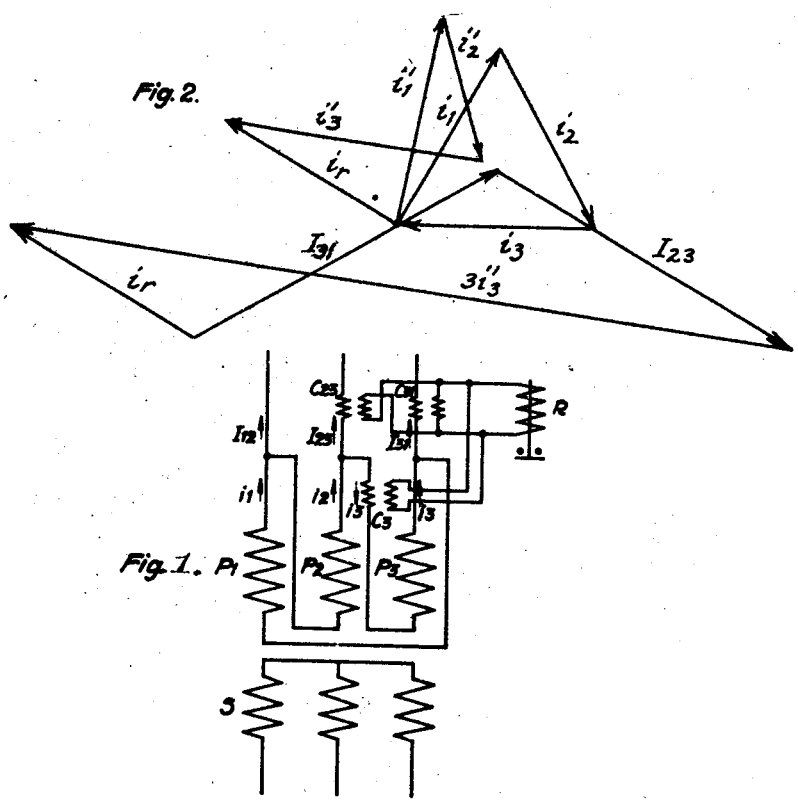
INVENTOR
Christian Ricard Wegener
by Wallace White
ATTORNEY.

Patented Sept. 30, 1930

1,776,873

UNITED STATES PATENT OFFICE

CHRISTIAN RICARD WEGENER, OF COPENHAGEN, DENMARK, ASSIGNOR TO ALLMANNA SVENSKA ELEKTRISKA AKTIEBOLAGET, OF VASTERAS, SWEDEN, A CORPORATION OF SWEDEN

FAULT DETECTOR FOR TRANSFORMERS

Application filed July 1, 1926, Serial No. 119,788, and in Denmark July 27, 1925.

In a transformer having one winding connected in delta, it has been previously proposed to indicate winding faults by current transformers, the primaries of which have been inserted in the connecting leads of said delta winding, while their secondaries have been connected in parallel through a relay, so that the latter has been influenced by the vector sum of the currents in the delta winding. During normal conditions, this vector sum is zero, but on the occasion of any short circuit inside the transformer it will have another value.

The aforesaid connection involves, however, either the introduction of one current transformer for each phase into the transformer or the passage of both ends of each phase of the delta winding through the cover of the transformer tank. Both of these arrangements will be complicated.

It has now been found, that the same result can be achieved by causing the currents of a smaller number of connecting leads of the delta winding to cooperate with the currents in some of the outgoing leads of the transformer in such manner, that the aforesaid vector sum will be the result. An arrangement of this kind forms the object of the present invention. If for instance in a three-phase delta-connected transformer the three currents flowing in the connecting leads are designated by $i_1, i_2, i_3$ and the currents in the outgoing leads by $I_{12}, I_{23}, I_{31}$, composed of the former ones as given by the indices, viz, so that $I_{12}=i_1-i_2$, $I_{23}=i_2-i_3$, $I_{31}=i_3-i_1$, counted with the currents as vectors and with uniform sign for circulating direction of current, the following equations are valid:

$$i_1+i_2+i_3=3i_1-I_{12}+I_{31}$$
$$i_1+i_2+i_3=3i_1-2I_{12}-I_{23}$$
$$i_1+i_2+i_3=i_1+2i_2-I_{23}$$
$$i_1+i_2+i_3=i_1+I_{23}-2i_3$$

By substituting in the right hand side of the equations $i_2$ or $i_3$ for $i_1$ still eight equations of this type may be obtained, in which the left hand side is $i_1+i_2+i_3$, that is, the current flowing through the fault, and the right hand side represents the vectorial sum of one or two internal currents and two or one external current, one or two of the current components being multiplied by 2 or 3. Each one of these twelve equations represents a combination of relay coils, current transformers, or primary coils on a common current transformer, which can be employed for giving an indication proportional to the fault current. Still further combinations may of course be arrived at for instance by adding together the aforesaid equations, but in most cases they will be too complicated for being practically suitable, as the same result can be accomplished in a more simple manner.

The operation by means of one or more of the "external" currents (in the outgoing leads) has the advantage, that a fault in these leads is also indicated by the detector.

In the accompanying drawing, one form of the invention is diagrammatically illustrated at Fig. 1, Fig. 2 being a vector diagram.

The transformer has a three-phase delta-connected primary winding and a star connected secondary winding S. The three phases of the delta-connected primary winding are designated by $P_1, P_2, P_3$, the currents therein by $i_1, i_2, i_3$, and the currents in the outgoing leads by $I_{12}, I_{23}, I_{31}$. Current transformers $C_3, C_{23}, C_{31}$ are inserted partly in the connecting leads, partly in the outgoing leads in such manner that they are traversed by the currents $i_3, I_{23},$ and $I_{31}$. The connections and ratios of the transformers should be such that the relay R is traversed by the vector sum $3i_3-I_{31}+I_{23}$ which is easily found to be equal to $i_1+i_2+i_3$. If in this case a short-circuit should occur between the outgoing leads from the main transformer to the current transformers, this fault would also be detected by the relay R.

If more than one working winding of the transformer is connected in polygon, either one or more of these windings may be employed for actuating the detector.

Referring to Fig. 2, $i_1, i_2,$ and $i_3$ are the normal currents in the delta-connected winding. When everything is normal and symmetrical, these currents form a closed equilateral triangle. When, however, a short circuit occurs between any turns on one leg of the transformer, a strong current will flow in these short-circuited turns which will counteract the magnetization in said leg. Consequently, the voltage generated in said leg will show a tendency to be lowered, but as the impressed voltage is substantially constant, a strong circulating current will flow in the delta winding to equalize the magnetization as far as possible, and this current will have the same phase in the entire delta winding. The resultant currents in the three legs will be $i_1'$, $i_2'$, and $i_3'$, and the vector sum of these will be $i_r$. The outgoing current $i_{23}$ forming vector difference between $i_2'$ and $i_3'$ will be the same as that resulting from the normal currents $i_2$ and $i_3$, as the additional circulating current caused by the fault is the same in both windings and eliminated by the subtraction. Similarly, the outgoing current $I_{31}$ will have its normal value. The current $i_r$ through the relay will be proportional to the vector sum of these currents and $3i_3'$, and this will be equal to three times the circulating current.

I claim as my invention:

In a transformer having a delta connected working winding, internal leads connecting together the phases of said winding, and external leads connected to the poles of said winding, the combination of three current transformers some of which are connected with their primaries in said internal leads and the rest with their primaries in said external leads, the secondaries of said current transformers being connected in parallel to a relay, the ratios of said current transformers being chosen to make the resultant secondary current proportional to the current circulating in said delta-connected working winding.

In testimony whereof I have signed my name to this specification.

CHRISTIAN RICARD WEGENER.